April 28, 1953 W. B. LYON ET AL 2,636,799
STORAGE AND DISPLAY UNIT
Filed March 6, 1951 8 Sheets-Sheet 1

INVENTORS
WILLIAM BRONSON LYON
JAMES A. GAVAGAN
ATTORNEY

April 28, 1953  W. B. LYON ET AL  2,636,799
STORAGE AND DISPLAY UNIT
Filed March 6, 1951  8 Sheets-Sheet 6

INVENTORS
WILLIAM BRONSON LYON
JAMES A. GAVAGAN
By
ATTORNEY

INVENTORS
WILLIAM BRONSON LYON
JAMES A. GAVAGAN
ATTORNEY

April 28, 1953     W. B. LYON ET AL     2,636,799
STORAGE AND DISPLAY UNIT

Filed March 6, 1951                                  8 Sheets—Sheet 8

INVENTORS
WILLIAM BRONSON LYON
JAMES A. GAVAGAN
By
ATTORNEY

Patented Apr. 28, 1953

2,636,799

UNITED STATES PATENT OFFICE 2,636,799

STORAGE AND DISPLAY UNIT

William Bronson Lyon, Grand Rapids, and James A. Gavagan, Van Dyke, Mich.; said Gavagan assignor to said Lyon Application March 6, 1951, Serial No. 214,186

6 Claims. (Cl. 312—234)

This invention is associated with storage and display equipment, and provides for the use for storage purposes of most of the volume of space between a floor and ceiling above a given floor area. In the preferred form, a cabinet is provided having an opening at approximately floor level permitting access to the contents of the cabinet for examination, insertion, or removal of whatever items the unit is adapted to handle. Equipment is included in this cabinet for moving the contents around a particular path so as to bring each item opposite the opening. The mechanism involved is generally confined to the upwardly-projected floor area occupied by the cabinet during its operation, and therefore does not require aisle clearance. The confinement of the operating area of the mechanism to that required by the fixed portion of the cabinet removes the necessity for maintaining unduly wide aisle spaces in a store, and thus permits a more full use of the available area. Other devices have been developed in the past having the general purpose of utilizing the entire space above a floor area to the ceiling; but except for the mechanisms shown and described in my issued patent Serial Number 2,513,502 (issued July 4, 1950), and that disclosed in my co-pending United States Patent Application Serial Number 212,534 filed on February 24, 1951, these prior devices have generally not proven to be of such a nature that they may be manufactured and operated without undue cost and attention to maintenance.

The present invention presents an improvement over the devices covered by my previously issued patent and co-pending application noted above. The principal point of distinction of the present invention over that disclosed in the cited co-pending application resides in the mechanism associated with the tension member for selectively engaging a set of storage hang rods to move them about the circuit to and from the floor-level opening. In the preferred form of the present invention, two independent movable chain attachments and one fixed attachment are utilized, each of the movable attachments being positioned by a separate rail. This arrangement eliminates the need for the central cam structure (used for positioning the chain attachments) shown in my co-pending application referred to above, and consequently vastly simplifies both the construction and the adjustment of the entire unit.

The several features of the present invention will be discussed in detail by an analysis of the particular embodiments illustrated in the accompanying drawings. In these drawings:

Figures 4 and 5 are in projection.

Figures 6 and 7 are in projection.

Figure 15 (see Sheet 8) presents a perspective view of the fixed chain attachment. Figure 15 is on an enlarged scale over that of Figure 3.

Figure 16 (see Sheet 8) presents a perspective "exploded" view of the components of the laterally-movable chain attachments. Figure 16 is on an enlarged scale over Figure 3.

Figures 17 through 21, inclusive, (see Sheet 8)

present diagrams of the components of the present invention in various positions during the cycle of operation.

Figure 1:
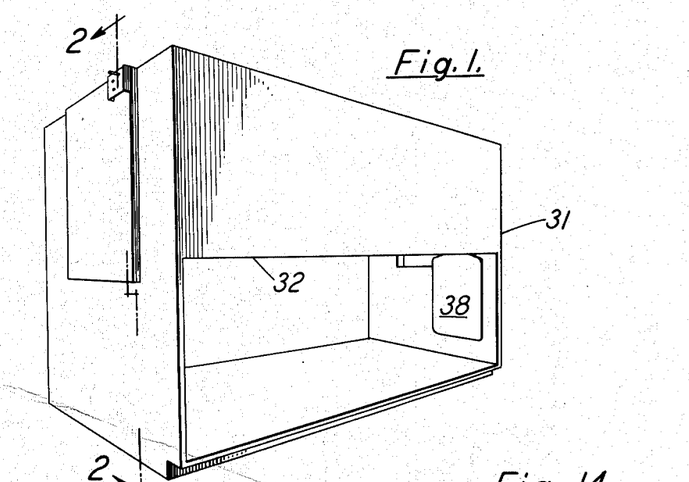
Figure 1 (see Sheet 1) is a perspective elevation of a cabinet unit embodying the present invention.
Figure 2:
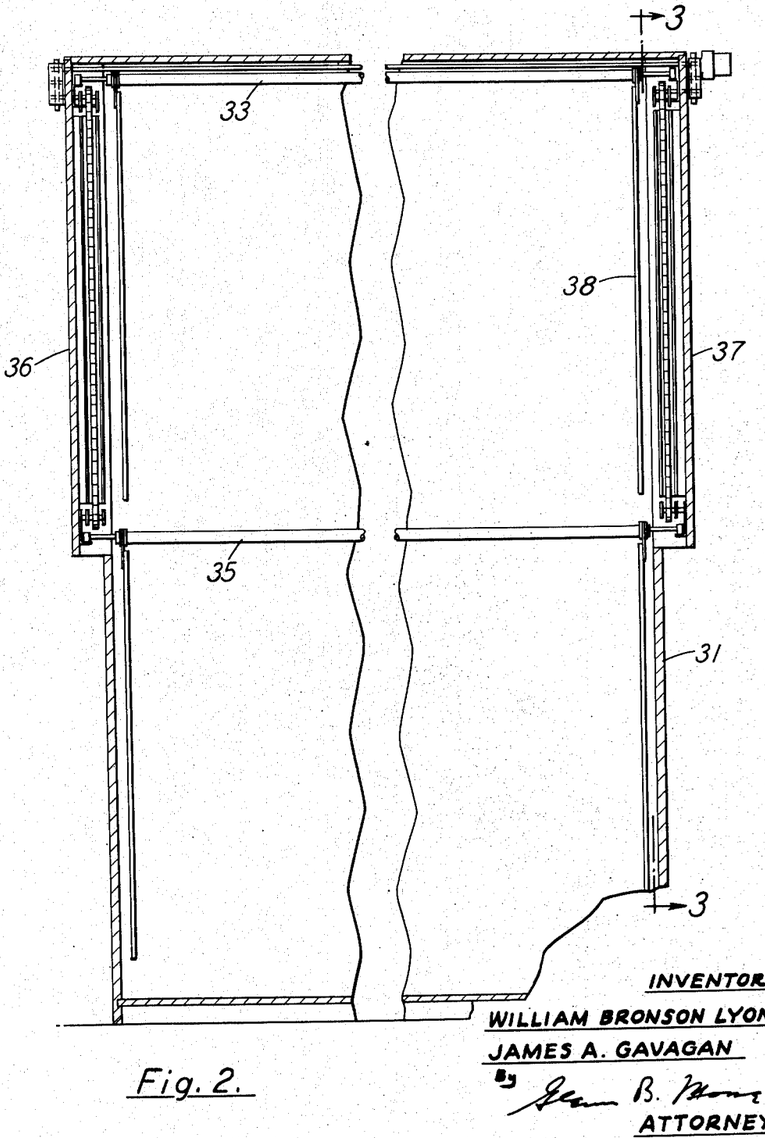
Figure 2 (see Sheet 2) presents an enlarged section taken on the plane 2—2 of Figure 1. A considerable portion of the central area of the cabinet is broken away in Figure 2 to conserve space.
Figure 3:
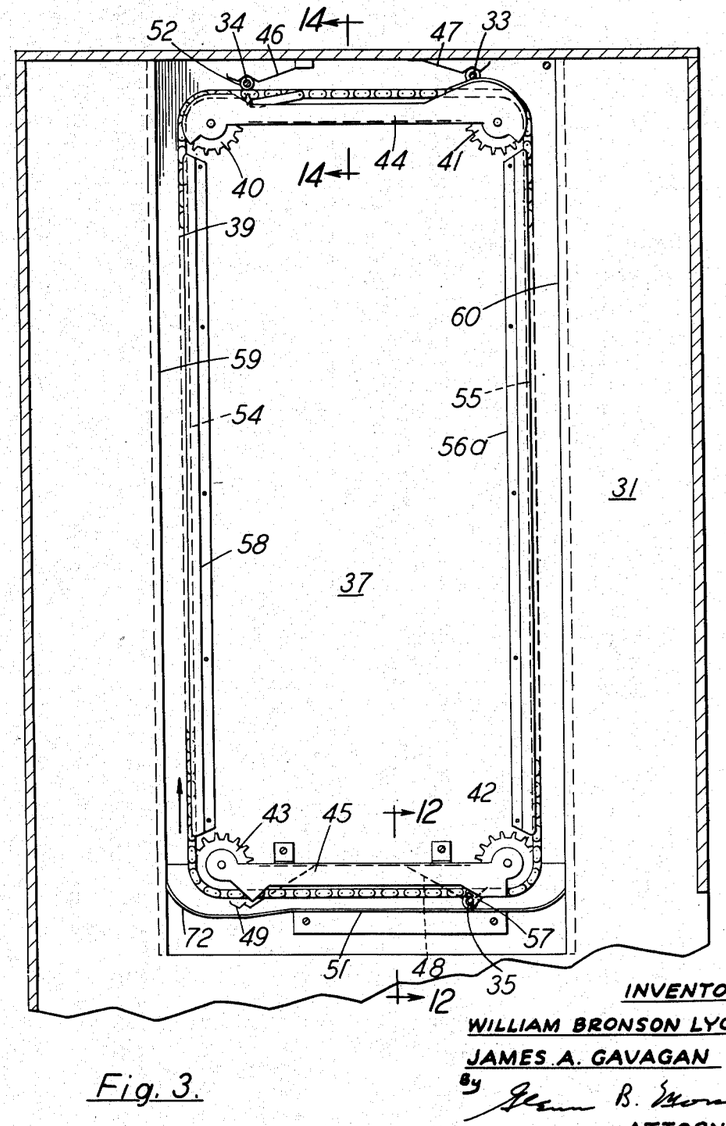
Figure 3 (see Sheet 3) is a section taken on the plane 3—3 of Figure 2, and presents a view of the hang rod moving mechanism in its entirety.
Figure 4:
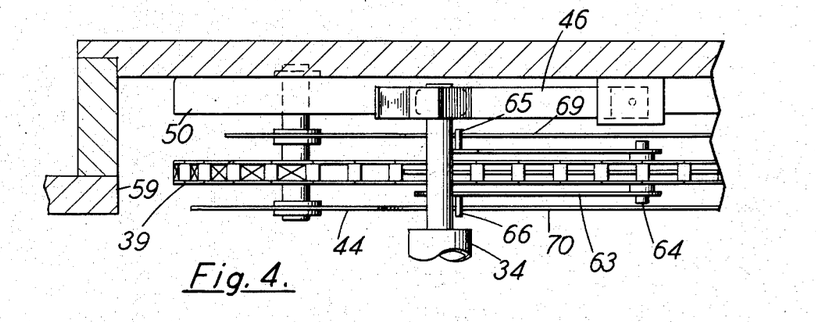
Figure 4 (see Sheet 4) presents a top view on an enlarged scale over that shown in Figure 3 of the upper left corner of the mechanism.
Figure 5:
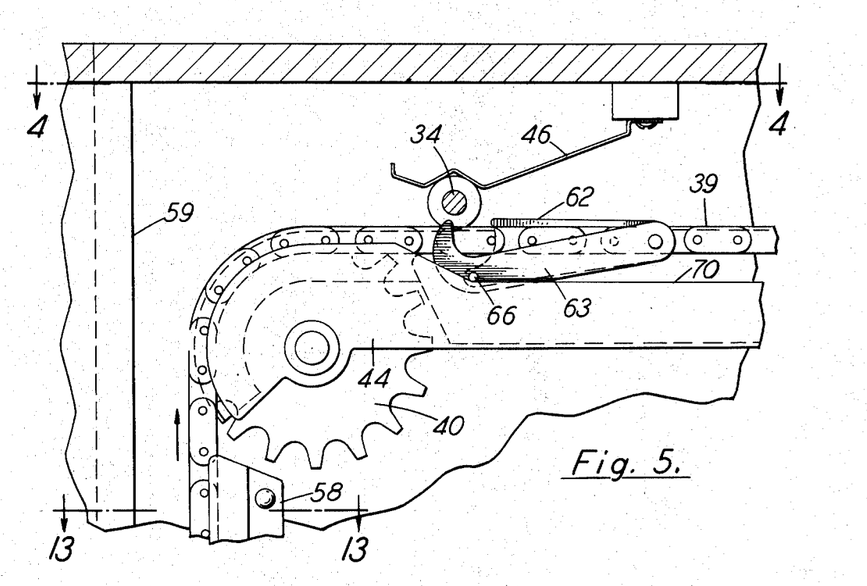
Figure 5 (see Sheet 4) presents a view in elevation of the upper left corner of device illustrated in Figure 3, Figure 5 being on an enlarged scale.

Referring to Figures 1, 2, and 3, a cabinet generally designated as 31 is provided with the opening 32 at the floor level so that the contents of the cabinet may be examined by attendants and customers without the necessity of ladders or other equipment. In the device illustrated in these drawings, the cabinet 31 is adapted to accommodate wearing apparel, and is accordingly provided with a series of hang rods 33, 34, and 35 on which conventional garment hangers may be placed. Machinery boxes 36 and 37 similar to those shown in my co-pending application previously referred to are provided to house the operating mechanism responsible for the movement of the hang rods 33, 34, and 35. Shielding panels as are indicated at 38 are also preferred with the present invention at opposite ends of each hang rod to isolate the merchandise from possible contact with the working mechanism, as shown in the cited application.

Figure 12:
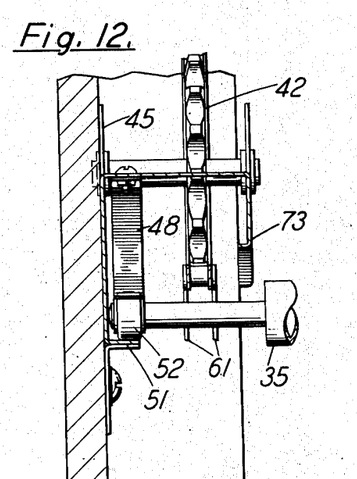
Figure 12 (see Sheet 1) presents a section on an enlarged scale taken on the plane 12—12 of Figure 3.
Figure 13:
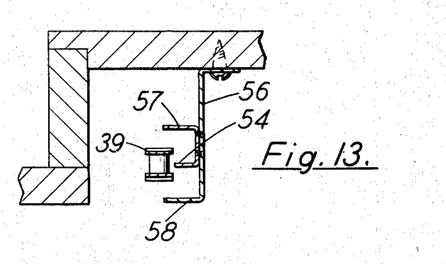
Figure 13 (see Sheet 4) presents a section taken on the plane 13—13 of Figure 5.
Figure 14:
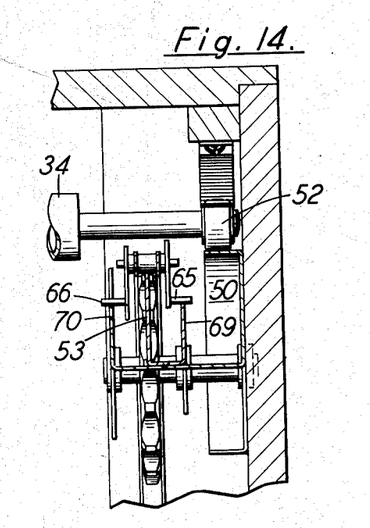
Figure 14 (see Sheet 1) presents a section on an enlarged scale taken on the plane 14—14 of Figure 3.
Figures 15, 16:
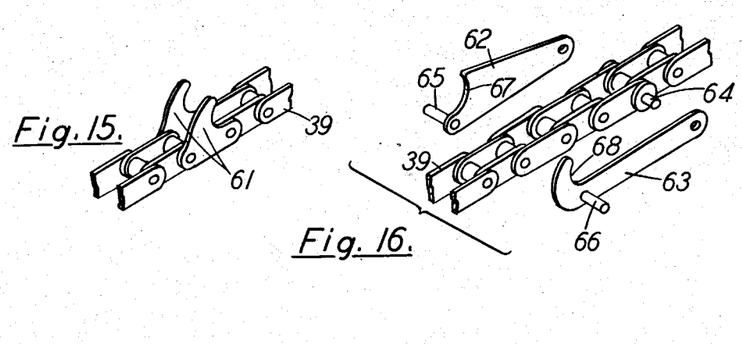

Referring to Figure 3, the hang rods 33, 34, and 35 are moved about a circuit by the action of the tension member, or chain 39. Sprockets 40, 41, 42, and 43 define the path of the chain 39. Sprockets 40 and 41 are mounted upon the bracket 44, and sprockets 42 and 43 upon the bracket 45. Brackets 44 and 45 are secured to the wall of the machinery box 37. A series of holding springs 46, 47, 48, and 49 establish rest positions of the hang rods adjacent to the four corners of the path of the chain 39. Upper and lower horizontal track units 50 and 51, respectively (see Figures 12 and 14 on Sheet 1), are provided to carry the weight of the hang rods over the horizontal legs of their path of travel. Rollers 52 are provided at the ends of each hang rod to engage the track sections 50 and 51. Upper horizontal chain rail 53 and vertical chain rails 54 and 55 (refer to Figures 13 on Sheet 4 and 14 on Sheet 1) are disposed close to the path of the chain 39. The vertical bearing rails 54 and 55 are secure to Z-shaped structural members 56 and 56a; and panels as indicated at 57 and 58 in Figure 13 are positioned as shown to stabilize the chain 39 against lateral movement.

The action of the attachments carried by the chain 39 serves to move the hang rods 33, 34, and 35 along the horizontal legs of their circuit, and also raise and lower them along the vertical legs of the circuit. The chain attachments may be adapted to bodily carry the hang rods during the vertical passages, or they may be adapted to merely supply the vertical forces necessary (leaving the establishment of the path of the hang rods to vertical sections of track). The hang rods are in effect confined between the chain 39 and the side walls 59 and 60 of the machinery boxes, in the illustrated device. As will appear from a detailed analysis of the following mechanism, however, it is not necessary that continuous bearing engagement take place between the rollers 52 and these sidewalls. Limiting the lateral movement of the chain attachments, plus the provision of suitable formed engaging surfaces will result in maintaining the engagement of the hang rods with the chain attachments without the necessity of the presence of a vertical track section bearing against the rollers 52.

The chain attachments operating to actually transfer forces from the moving chain 39 include the fixed hook 61. The laterally-movable attachments 62 and 63 are carried by the chain 39, and are pivotally mounted on the pin 64. Attachment 62 is provided with the laterally-extending pin 65, and is adapted to carry the weight of the hang rods during their downward passage along the front vertical leg of their path of travel. Attachment 63 is provided with the oppositely-extending lateral pin 66, and this chain attachment serves to lift the hang rods up along the rear vertical leg of their path of travel, and also to pull them over the upper front corner. The curved engaging surface 67 on attachment 62 engages the various hang rods securely so that the forces involved in moving these hang rods maintain firm engagement. The contour of the surface 68 should create a slight tendency for the member 63 to become disengaged, when coupled with the effect of gravity on that member. The lateral positioning of the chain attachments 62 and 63 on the upper horizontal leg of the path of travel is provided by the engagement of the positioning rails 69 and 70 with the pins 65 and 66, respectively (see Figure 14 on Sheet 1).

Figure 7:
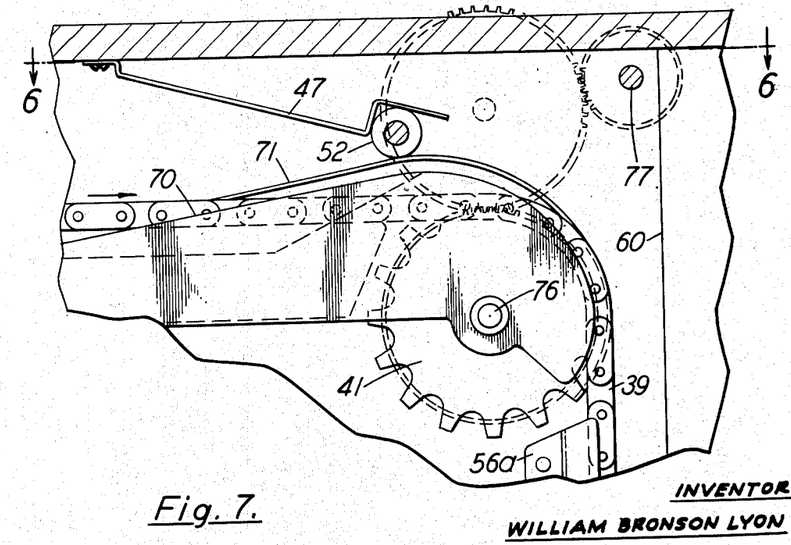
Figure 7 (see Sheet 5) presents a view in elevation of the mechanism surrounding the upper right corner of Figure 3 (on an enlarged scale).
Figure 8:
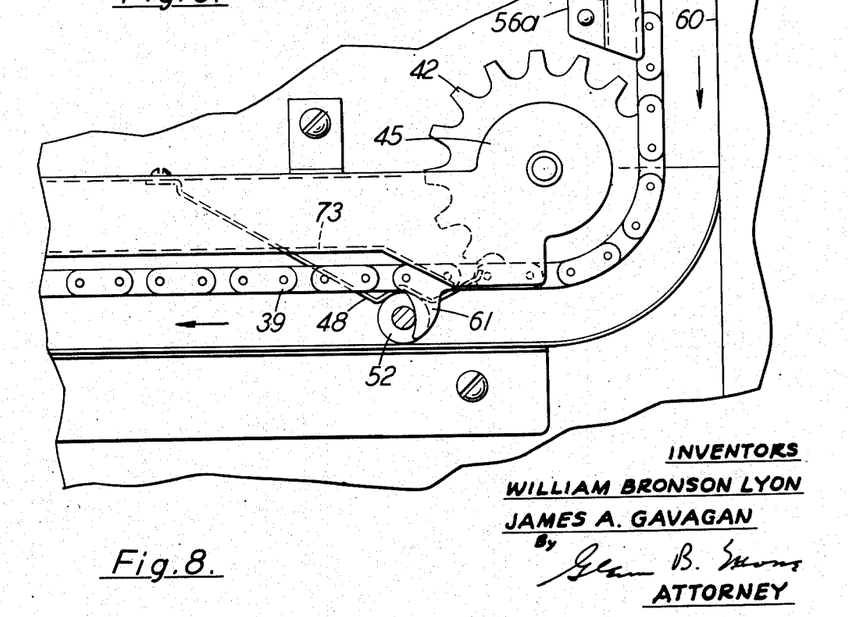
Figure 8 (see Sheet 6) presents a view in elevation of the lower right corner of the mechanism shown in Figure 3, on an enlarged scale.
Figure 9:
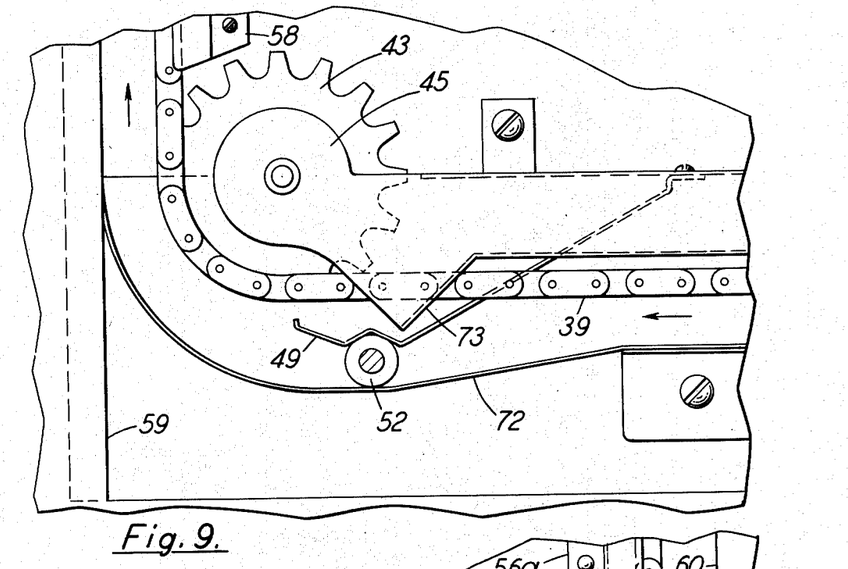
Figure 9 (see Sheet 6) presents a view in elevation of the mechanism associated with the lower left corner of Figure 3, on an enlarged scale.
Figure 10:
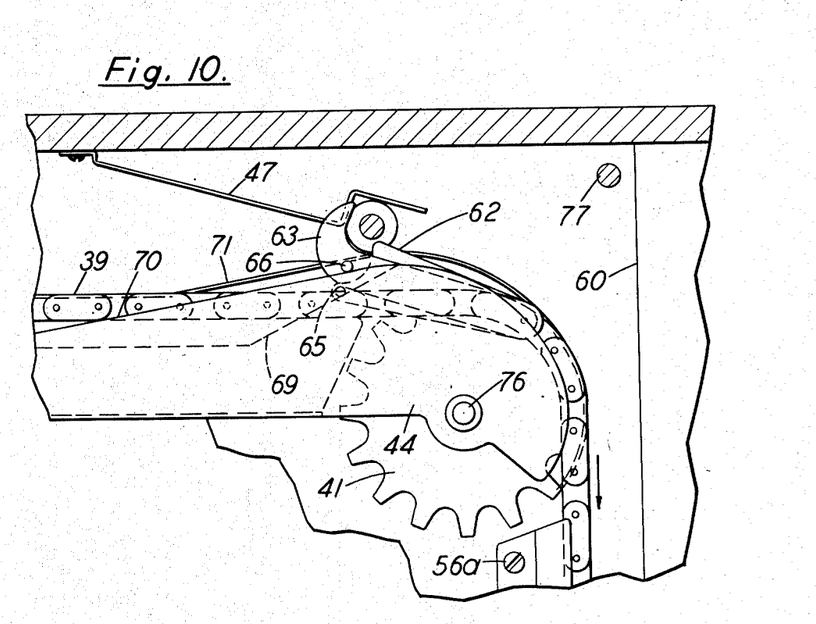
Figure 10 (see Sheet 7) presents a view of the upper right corner of the mechanism shown in Figure 3, on an enlarged scale, and with the chain attachments about to engage a hang rod.
Figure 11:
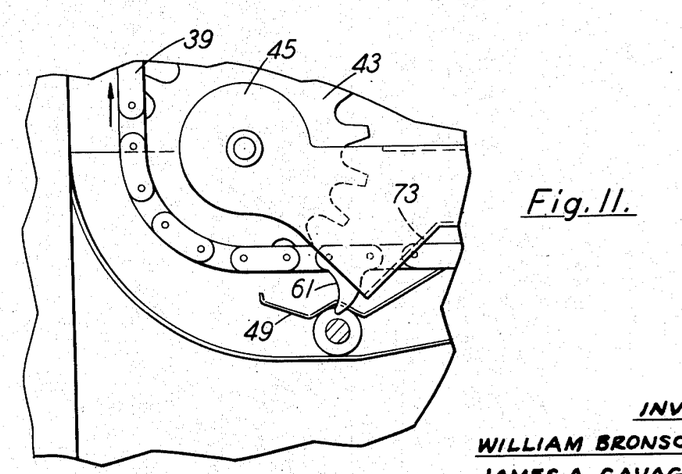
Figure 11 (see Sheet 7) presents a view of the lower left corner of the mechanism shown in Figure 3, on an enlarged scale, showing the fixed chain attachment clearing a hang rod.

Upper and lower track units 50 and 51 are provided with the sections 71 and 72, respectively (see Figures 7 on Sheet 5, and 9 on Sheet 6), over which the hang rods are permitted to assume a position sufficiently far away from the axis of the chain 39 as to bring them out of the path of movement of the fixed hook 61. With this arrangement, it will be seen that the fixed hook is only capable of engaging the rods at the upper left and lower right corners of the circuit shown in Figure 3. The contour of the positioning rails 69 and 70 causes the laterally-movable attachment 63 to engage the rods at the upper right corner. Movement of the chain then causes the portion 68 on the attachment 63 to pull the hang rods over the corner, and the weight of the rods then causes them to drop down and become supported by the curved portion 67 of the attachment 62. It may be noted here that the double positioning rail arrangement (rails 69 and 70) are provided to give sequence to the movement of the engaging members; since the member 62 may be elevated only after it has passed under the hang rod, and member 63 should be elevated ahead of the hang rod. Use of a spring-biased member 62 (rather than a positive positioning) permits a single positioning rail which is then used on the member 63. Member 62 would be depressed against spring action as it passes under the hang rod, due to the slope of the upper surface leading to the engaging surface 67. The spring action should be very light so as not to cause forward movement of the hang rods. On arrival at the lower right corner of the path of travel, the inwardly-turned flange 73 engages the pin 66 and elevates the attachment 63 out of position where it can further engage the hang rod. No provision is made for the lateral positioning of the member 62 over the lower horizontal leg; since this member is completely inactive, and consequently may be permitted to hang as determined by the force of gravity.

At the lower left corner of the circuit shown in Figure 3, the flange 73 again permits the pin 66 and the attachment 63 to drop to a position where a hang rod held by spring 49 may be engaged and lifted up the rear vertical leg of the circuit. The contours of the rails 69 and 70 at the upper left portion of the circuit permit the attachments to drop out of engaging position and to pass underneath the hang rods, continuing to be inactive until urged into engaging position at the upper right corner. To assure disengagement at the upper left corner and still have a contour 68 formed to maintain secure engagement over the vertical leg, it is sometimes preferred to form the rail 70 so as to actively pull on the pin 66. As an alternative, a positioning rail may be used on the upward leg to hold the member 63 in engagement. Panels 57 and 58 may be used as rails, if desired, on both vertical legs. As a result of the interaction of the various tracks, rails, and chain attachments, the fixed attachment will act at the upper left and lower right corners (referring to Figure 3 on Sheet 3), while the movable chain attachments will act at the lower left and upper right corners of the circuit. With four legs of the circuit and three hang rods, the resulting action of this mechanism will be to progressively advance each hang rod which is in a position to proceed along an entire length without colliding with another hang rod. With the hang rods initially placed in the arrangement shown in Figure 3 with respect to the chain attachments, the action will continue indefinitely and will result in positioning in sequence each hang rod so that its contained merchandise comes opposite the opening 32 of the cabinet.

Figure 17:
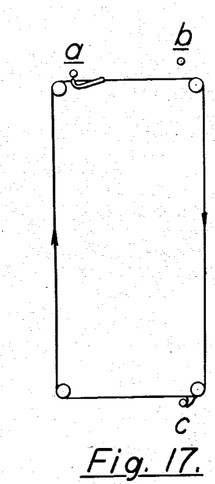
Figure 18:
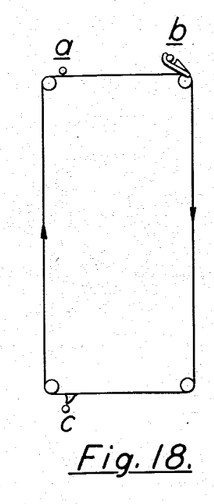
Figure 19:
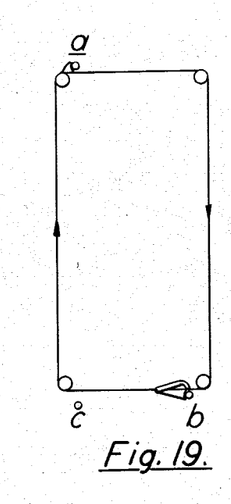
Figure 20:
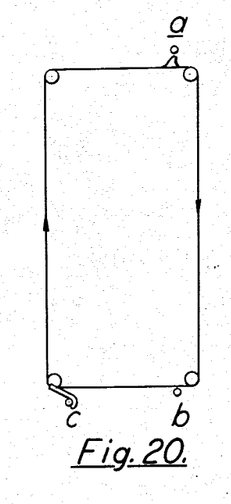
Figure 21:
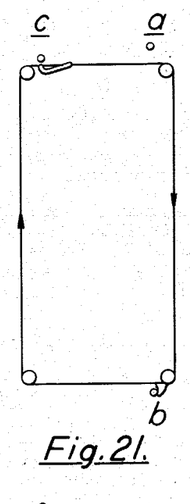

The cycle of operations of this device may be more clearly understood by reference to the diagrams presented in Figures 17 to 21, inclusive (see Sheet 8). In each of these diagrams, particular hang rods have been designated as *a*, *b*, and *c*. In Figure 17, the fixed hook is shown about to engage the hang rod *c*, while the movable attachments are shown passing underneath the hang rod *a*. The attachments are at diametrically opposite points, and the next movement of the chain will result in moving the hang rod *c* to the position shown in Figure 18. This chain movement results in placing the laterally-movable attachments at the upper right corner, and the track system previously described results in placing them in engagement with the hang rod *b*. Further movement of the chain results in lowering the hang rod *b* to the lower right corner of the path of movement, and this same movement places the fixed hook in a position to engage the hang rod *a* (see Figure 19). The movement of the chain then urges the hang rod *a* over to the upper right corner, and positions the laterally-movable attachments for engagement with the hang rod *c* (see Figure 20). The fixed hook has urged the hang rod *a* along the inclined section 71 to a point where it comes out of engagement with the hook, and therefore the hang rod may be held in position by the spring member associated with that corner until the hang rod is engaged by the laterally-movable attachments. Further movement of the chain after the Figure 20 position has been reached results in elevating the hang rod *c* to the upper left position, and releasing the laterally-movable chain attachments so that they pass underneath the hang rod *c*, leaving it in engagement with the spring member associated with that corner. It will be noted that the pattern arrangement of the hang rods shown in Figure 21 is the same as that shown in Figure 17. It is thus seen that a step-by-step action has been generated which, if continued, will result in the progressive movement of each hang rod around its circuit to and from a position where it becomes accessible from the opening 32 in the cabinet.

Figure 6:
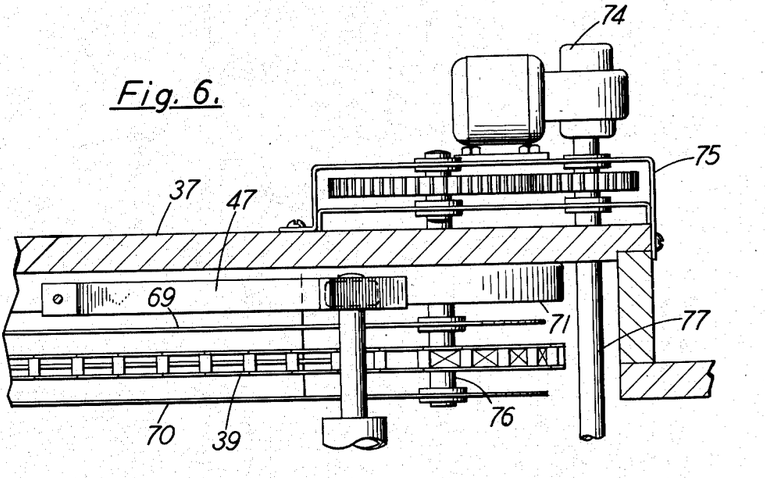
Figure 6 (see Sheet 5) presents a top view of the mechanism associated with the upper right hand corner of Figure 3, on an enlarged scale.

Referring to Figure 6, the drive mechanism for the elements previously discussed includes the gear motor unit 74 driving a suitable train of gears contained within the housing 75. This housing is secured to the machinery box 37, and drives the sprocket 41 by the shaft 76. Power for the operation of the machinery box 36 at the opposite end of the cabinet is derived from the shaft 77 which runs substantially the entire width of the cabinet and not only supplies the power for that portion of the device but also serves to accurately synchronzie the movements of the hang rod positioning mechanism.

The particular embodiments of the present invention that have been illustrated in the accompanying drawings and discussed herein are for illustrative purposes only and are not to be taken as a limitation upon the scope of the appended claims. In these claims it is our intention to claim the entire invention to which we are entitled in view of the prior art.

We claim:

1. In a conveying mechanism having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed with respect to said tension transmitting means; second and third rod-engaging means, said second and third rod-engaging means being carried by said tension transmitting means, and movable laterally with respect to said tension transmitting means; track means, said track means being adapted to guide said track-engaging means of said rod means, and establishing at least one point at which said rod means are positioned outside the path of said first rod-engaging means; rail means, said rail means being disposed to bear on a portion of said second rod-engaging means and thereby establish the relative lateral position of said rod-engaging means to said tension transmitting means; and means for urging said third rod-engaging means to engaging position ahead of said rod means.

2. In a storage and display cabinet having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed with respect to said tension transmitting means; second and third rod-engaging means, said second and third rod-engaging means being carried by said tension transmitting means, and movable laterally with respect to said tension transmitting means; track means adapted to guide said track-engaging means of said rod means, said track means establishing at least one point at which said rod means are positioned outside the path of said first rod-engaging means; rail means, said rail means being disposed to bear on a portion of said second rod-engaging means and thereby establish the relative lateral position of said second rod-engaging means to said tension transmitting means, said rail means positioning said second rod-engaging means to engage said rod means at said point where said first rod-engaging means are disengaged; and means for urging said third rod-engaging means into engaging position ahead of said rod means.

3. In a storage and display cabinet having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed with respect to said tension transmitting means; second and third rod-engaging means, said second and third rod-engaging means being carried by said tension transmitting means, and movable laterally with respect to said tension transmitting means; track means adapted to guide said track-engaging means of said rod means, said track means establishing at least one point at which said rod means are positioned outside the path of said first rod-engaging means; rail means, said rail means being disposed to bear on a portion of said second rod-engaging means and thereby establish the relative lateral position of said second rod-engaging means to said tension transmitting means, said rail means positioning said second and third rod-engaging means to engage said rod means at and for a limited distance from said point where said first rod-engaging means are disengaged; and means for urging said third rod-engaging means to engaging position ahead of said rod means.

4. In a storage and display cabinet having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed with respect to said tension transmitting means; second and third rod-engaging means, said second and third rod-engaging means being carried by said tension transmitting means, and movable laterally with respect to said tension transmitting means; track means adapted to guide said track-engaging means of said rod means, said track means establishing at least one point at which said rod means are positioned outside the path of said first rod-engaging means; and first and second rail means, said first and second rail means being disposed to bear on a portion of said second and third rod-engaging means respectively and thereby establish the relative lateral position of said rod-engaging means to said tension transmitting means, said first and second rail means positioning said second and third rod-engaging means to engage said rod means at said point where said first rod-engaging means are disengaged.

5. In a storage and display cabinet having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed wtih respect to said tension transmitting means; second and third rod-engaging means, said second and third rod-engaging means being carried by said tension transmitting means, and pivotally mounted on said tension transmitting means; track means adapted to guide said track-engaging means of said rod means, said track means establishing at least one point at which said rod means are positioned outside the path of said first rod-engaging means; and first and second rail means, said first and second rail means being disposed to bear on a portion of said second and third rod-engaging means respectively and thereby establish the relative lateral position of said rod-engaging means to said tension transmitting means, said first and second rail means positioning said second and third rod-engaging means to engage said rod means at said point where said first rod-engaging means are disengaged.

6. In a storage and display cabinet having article-supporting means including rod means provided with track-engaging means, and also including endless flexible tension transmitting means, guide means for said tension transmitting means establishing a path of movement, and drive means for said tension transmitting means, the combination comprising: first rod-engaging means substantially fixed with respect to said tension transmitting means; second and third rod-engaging means, said second and third rod-engaging means being carried by said tension transmitting means, and movable laterally with respect to said tension transmitting means; track means disposed in a closed circuit having two vertical and two horizontal sections and adapted to guide said track-engaging means of said rod means along a path causing said rod means to be engaged by said first rod-engaging means over each of two opposite sections of said closed circuit, said track means establishing locations at the end of each of said two opposite sections at which said rod means are positioned outside the path of said first rod-engaging means; and first and second rail means, said first and second rail means being disposed to bear on a portion of said second and third rod-engaging means respectively and thereby establish the relative lateral position of said rod-engaging means to said tension transmitting means, said first and second rail means positioning said second and third rod-engaging means to engage said rod means at said points where said first rod-engaging means are disengaged.

WILLIAM BRONSON LYON.
JAMES A. GAVAGAN.

References Cited in the file of this patent

UNITED STATES PATENTS

| Number | Name | Date |
|---|---|---|
| 893,563 | Basler | July 14, 1908 |
| 1,047,904 | Beinhoff | Dec. 17, 1912 |
| 1,660,901 | Willsea | Feb. 28, 1928 |
| 1,879,416 | Mutschler | Sept. 27, 1932 |
| 2,395,947 | Walker | Mar. 5, 1946 |
| 2,513,502 | Lyon | July 4, 1950 |